(12) United States Patent
Avery

(10) Patent No.: US 6,662,688 B1
(45) Date of Patent: Dec. 16, 2003

(54) LUG WRENCH

(75) Inventor: Bryan K. Avery, Angier, NC (US)

(73) Assignee: Hornet Tool Company, Angier, NC (US)

( * ) Notice: Subject to any disclaimer, the term of this patent is extended or adjusted under 35 U.S.C. 154(b) by 0 days.

(21) Appl. No.: 10/265,749

(22) Filed: Oct. 7, 2002

(51) Int. Cl.[7] ............................................. B25B 13/00
(52) U.S. Cl. .................... 81/124.5; 7/100; 81/177.2; 81/177.6; 81/177.85; 81/177.7; 81/177.5
(58) Field of Search ............................. 81/124.5, 124.4, 81/124.6, 124.7, 177.1, 177.6, 177.8, 177.2, 177.5, 177.7, 177.85; 7/100; D8/21

(56) References Cited

U.S. PATENT DOCUMENTS

| | | | | |
|---|---|---|---|---|
| 1,169,496 A | * | 1/1916 | Knauff ........................ 403/100 |
| 1,360,121 A | * | 11/1920 | Lawrence ................... 81/124.4 |
| 1,796,083 A | * | 3/1931 | CArlberg ..................... 81/440 |
| 2,212,716 A | * | 8/1940 | Noble et al. ................. 254/131 |
| 2,465,152 A | | 3/1949 | Ellison |
| 2,738,694 A | * | 3/1956 | Boatright .................... 81/124.5 |
| 2,807,179 A | | 9/1957 | Rudd, Sr. |
| 2,939,351 A | | 6/1960 | Falk |
| D218,140 S | * | 7/1970 | Johannsen .................... D8/29 |
| 3,587,366 A | | 6/1971 | Klein et al. |
| 3,742,790 A | | 7/1973 | Galley |
| 3,905,254 A | * | 9/1975 | Palatnick et al. ............. 81/57.3 |
| 4,236,266 A | | 12/1980 | Hannah et al. |
| 4,505,171 A | | 3/1985 | Chang |
| 4,625,353 A | * | 12/1986 | Tamez et al. .................. 7/100 |
| 4,939,960 A | * | 7/1990 | Kinzli ........................ 81/124.4 |
| 5,685,207 A | * | 11/1997 | Hubert ....................... 81/177.5 |
| 5,797,300 A | * | 8/1998 | Fairbanks ..................... 81/60 |
| D409,060 S | | 5/1999 | Lucy |
| 5,921,157 A | | 7/1999 | Smith et al. |
| 6,240,809 B1 | * | 6/2001 | Sasarak ......................... 81/60 |
| 6,343,532 B1 | * | 2/2002 | Lucy ......................... 81/177.6 |

* cited by examiner

*Primary Examiner*—Joseph J. Hail, III
*Assistant Examiner*—Hadi Shakeri
(74) *Attorney, Agent, or Firm*—Withrow & Terranova PLLC

(57) ABSTRACT

The present invention relates to an improved lug wrench. In one embodiment, the lug wrench includes a first arm connected to a mounting member, two foldable arms connected to the first arm, and a fourth detachable arm capable of attaching to the mounting member in a first and second positions. The lug wrench can form a cross-shape by extending the foldable arms such that they are substantially perpendicular to the first arm and attaching the fourth detachable arm to the mounting member in the first position such that it is substantially perpendicular to the foldable arms. The size of the lug wrench can be minimized by folding the foldable arms and attaching the fourth detachable arm to the mounting member in the second position such that they are substantially parallel to the first arm. Other embodiments include ratcheting without folding and optional tire cover removal and hammer head attachments.

34 Claims, 7 Drawing Sheets

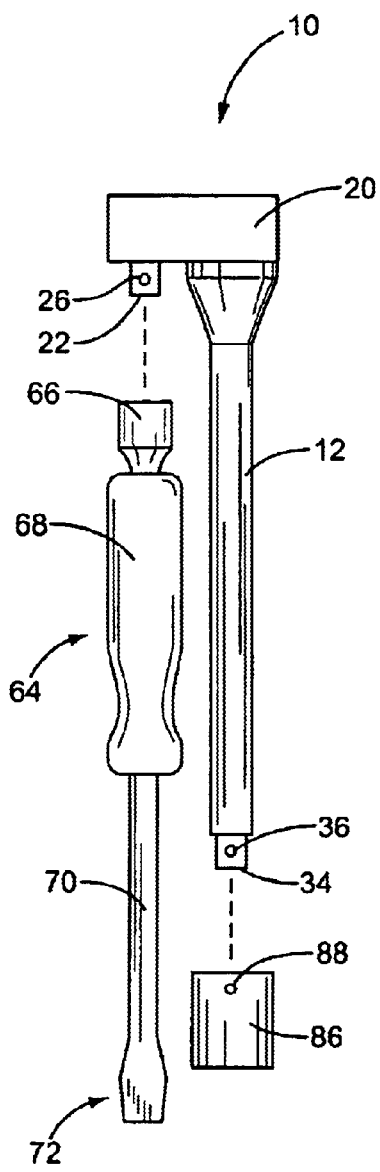
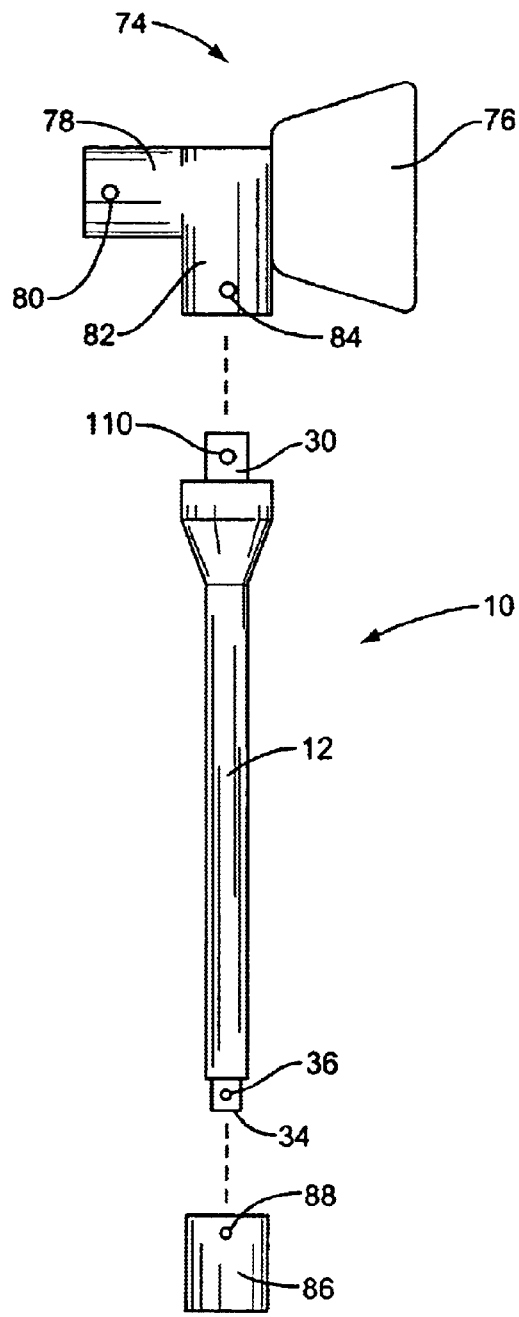
FIG. 6
FIG. 7

LUG WRENCH

FIELD OF THE INVENTION

The present invention relates to an improved lug wrench.

BACKGROUND OF THE INVENTION

Removing a tire from an automobile or similar mobile apparatus is a common task performed routinely everyday. Typically, a tire is mounted to a wheel using lug nuts. A hub cap may be placed over the wheel to cover the wheel for aesthetic purposes. In order to remove a tire for repair or replacement, a tire cover or hub cap may need to be removed to access the lug nuts. A lug wrench is used to remove the lug nuts, and the tire is removed.

A typical lug wrench is shaped in the form of a rigid cross that has handles on each side of the lug wrench. The handles allow for easy application of rotational force on the lug nuts. However, a cross-shaped lug wrench is large and not easily stored in a small, convenient space. Other smaller lug wrenches have been designed that are not in the shape of a cross and are therefore smaller in size. These lug wrenches do not provide handles for easy application of force to the lug nuts. Thus, there remains a need for a cross-shaped lug wrench capable of folding, thereby reducing its size for storage.

SUMMARY

The present invention relates to an improved lug wrench having four arms forming a cross shaped rigid structure for removing lug nuts from a wheel of an automobile or other mobile structure containing wheels. The improved lug wrench includes a first arm connected to a mounting member, a second and a third foldable arms foldably connected to the first arm, and a fourth detachable arm capable of attaching to the mounting member in a first and a second position. The lug wrench can be extended by extending the second and third foldable arms such that they are substantially perpendicular to the first arm and attaching the fourth detachable arm to the mounting member in the first position such that it is substantially perpendicular to the second and third foldable arms and substantially in-line with the first arm to form a cross shape. The size of the lug wrench can be minimized for storage by folding the second and third foldable arm such that they are substantially parallel to the first arm and attaching the fourth detachable arm to the mounting member in the second position such that it is also substantially parallel to the first arm.

In another embodiment, each of the first, second, third, and fourth arms include attachment stub capable of attaching to one of a plurality of sockets designed to fit the lug nuts. In addition, each of the attachment stubs includes a spring-loaded ball for securing the socket to the attachment stub.

In another embodiment, each of the attachment stubs of the first, second, third, and fourth arms includes a spring-loaded pin for securing the socket to the attachment stub.

In another embodiment, the lug wrench of the present invention includes a detachable hammer head intended to be used for securing a hub cap back on a wheel. The hammer has a first and second socket both designed to attach to the mounting member such that the hammer head is either substantially in-line with the first arm or substantially perpendicular to the first arm. In addition, the lug wrench may include a detachable hammer handle capable of attaching to the mounting member during storage. The hammer handle can be detached from the mounting member and used in combination with the hammer head to form an independent hammer.

In another embodiment, the lug wrench of the present invention includes a detachable tire cover removal tool. The detachable tire cover removal tool has a first end capable of attaching to the mounting member.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIG. 6 illustrates a lug wrench having a detachable tire cover removal tool according to one embodiment of the present invention; and FIG. 7 illustrates a lug wrench having a detachable hammer head according to one embodiment of the present invention.

DETAILED DESCRIPTION OF THE INVENTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to an improved lug wrench that is capable of being folded and/or contains various improved aspects over lug wrenches in the prior art. Several different embodiments of the present invention are described herein.

Figure 1:
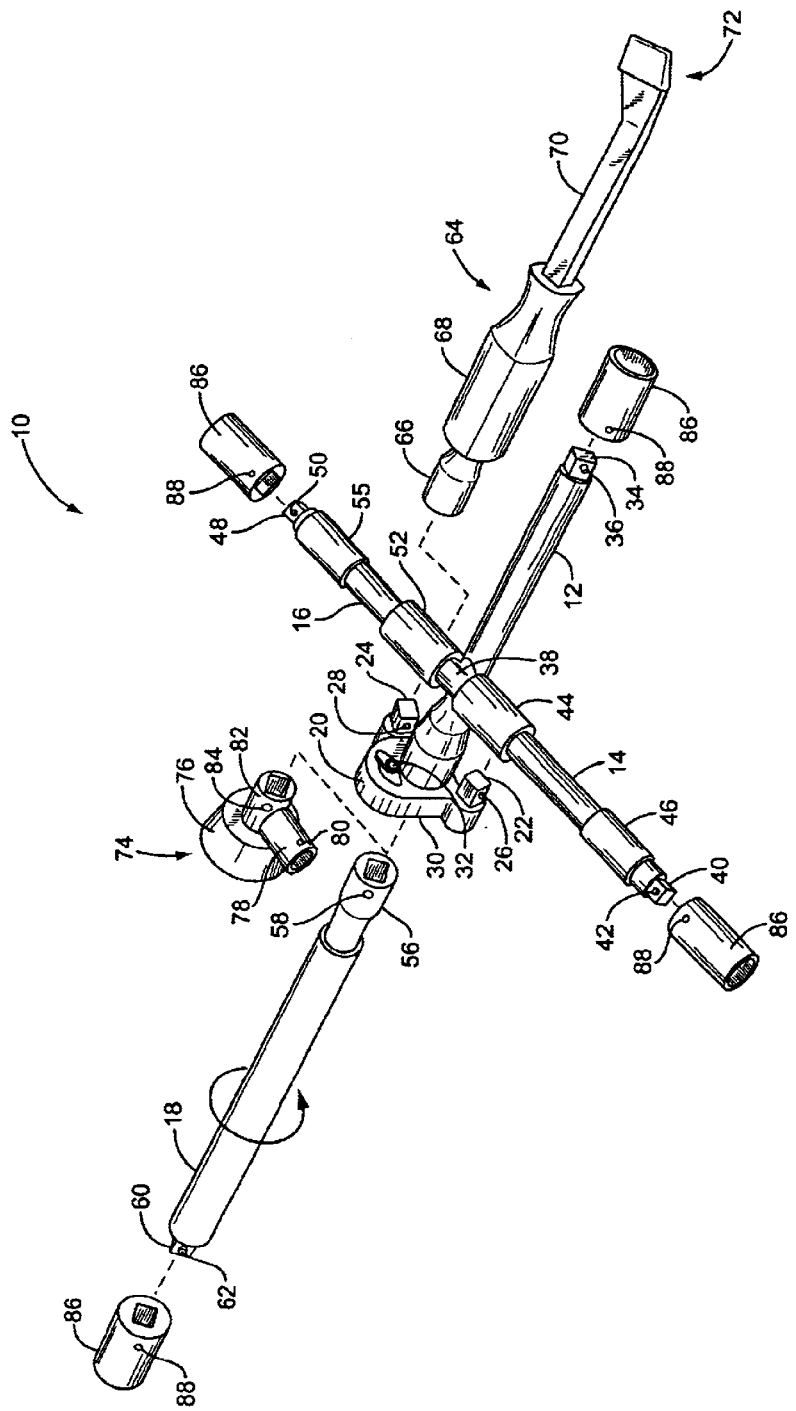
FIG. 1 illustrates an improved lug wrench having been fully extended according to one embodiment of the present invention.

In one embodiment, as illustrated in FIG. 1, a lug wrench 10 includes a first arm 12, a second foldable arm 14, a third foldable arm 16, and a fourth detachable arm 18. At one end, the first arm 12 includes a mounting member 20 having a first attachment stub 22 and a second attachment stub 24, where the first attachment stub 22 and the second attachment stub 24 have spring-loaded balls 26 and 28, respectively. The mounting member 20 also includes a third attachment stub 30 with a spring-loaded pin (not shown), where the third attachment stub 30 is capable of rotating in a direction about an axis passing substantially in-line with or parallel to the first arm 12, thereby being capable of a ratcheting action. The mounting member 20 may also include a switch 32 capable of being used to control the direction of rotation of the third attachment stub 30. At the other end, the first arm 12 includes a fourth attachment stub 34 having a spring-loaded pin 36.

The second foldable arm 14 is attached to the first arm 12 by a coupling member 38 and includes a fifth attachment stub 40 with a spring-loaded pin 42. A first slidable locking member 44 is capable of sliding along the second foldable arm 14, thereby locking the second foldable arm 14 in its extended state or unlocking the second foldable arm 14 such that it may be folded. Preferably, the second foldable arm 14 includes a movement limiting element 46 capable of limiting the movement of the first slidable locking member 44 in order to prevent the first slidable locking member 44 from being removed from the second foldable arm 14.

The third foldable arm 16 is also attached to the first arm 12 by the coupling member 38 and includes a sixth attachment stub 48 with a spring-loaded pin 50. A second slidable locking member 52 is capable of sliding along the third foldable arm 16, thereby locking the third foldable arm 16 in its extended state or unlocking the third foldable arm 16 such that it may be folded. Preferably, the third foldable arm 16 includes a movement limiting element 54 capable of limiting the movement of the second slidable locking member 52 in order to prevent the second slidable locking member 52 from being removed from the third foldable arm 16.

The fourth detachable arm 18 has a first end 56 having a hole 58 and is capable of attaching to the third attachment stub 30 of the mounting member 20. In order to attach the fourth detachable arm 18 to the third attachment stub 30, the fourth detachable arm 18 is placed over the third attachment stub 30 and the spring-loaded pin (not shown) and the hole 58 are aligned such that the pin enters the hole 58, thereby locking the fourth detachable arm 18 onto said third attachment stub 30. The fourth detachable arm 18 is capable of rotating in the direction controlled by the switch 32, thereby being capable of performing a ratcheting action, when attached to the third attachment stub 30. The first end 56 is also capable of attaching to the first attachment stub 22 of the mounting member 20, which will be discussed in detail below. At the other end, the fourth detachable arm 18 has a seventh attachment stub 60 including a spring-loaded pin 62.

In operation, the improved lug wrench 10 is assembled into a cross shape by attaching the fourth detachable arm 18 to the third attachment stub 30 of the mounting member 20. The sockets 86 may then be attached to the arms 12, 14, 16, and 18. The switch 32 can be set to accommodate the desired rotational direction of the lug wrench 10, thereby preparing the lug wrench 10 to either tighten or loosen lug nuts (not shown). Alternatively, the switch 32 may be positioned such that the fourth detachable arm 18 cannot be rotated, thereby allowing the lug wrench 10 to operate as a standard lug wrench. When the switch 32 is set to allow the fourth detachable arm 18 to rotate, the lug wrench 10 can be used to perform a ratcheting action. In this instance, the first arm 12 or the detachable fourth arm 18 may be used as a handle of the lug wrench 10 and a force may be applied to the second foldable arm 14 and/or the third foldable arm 16, thereby rotating the lug wrench 10 in a ratchet-like fashion in order to remove the lug nuts.

The lug wrench 10 also may also include a detachable tire cover removal tool 64 having a first end 66 capable of attaching to the second attachment stub 24. The detachable tire cover removal tool 64 also includes a handle 68 and a working member 70 having a pointed tip covered by a pointed tip and tip cover 72. The pointed tip and tip cover 72 is designed to be wedged beneath a tire cover (not shown) in order to remove the tire cover from a wheel (not shown) thereby exposing the lug nuts (not shown) for removal.

The lug wrench 10 may also include a detachable hammer head 74 preferably having a rubber head 76. However the head 76 may be made of any material, such as metal or plastic for example. The detachable hammer head 74 includes a first socket 78 having a bole 80 that attaches to the third attachment stub 30 of the mounting member 20 such that the detachable hammer head 74 is substantially perpendicular to the first arm 12. The detachable hammer head 74 may also include a second socket 82 with a hole 84 capable of attaching to the third attachment stub 30 of the mounting member 20 such that the detachable hammer bead 74 is substantially in line with the first arm 12. In addition, the first and second socket 78 and 82 nay be used to attach the hammer head 74 to the sixth attachment stub 60 on the fourth detachable arm 18. Therefore, the fourth detachable arm 18 may be used in combination with the detachable hammer head 74 to form a hammer (not shown) that is independent from the lug wrench 10.

In addition, the lug wrench 10 is adapted to accept numerous sockets 86 being of different sizes for different size lug nuts. Each of the sockets 86 has a hole 88 that attaches to the attachment stubs 34, 40, 48, and 60. Further, the holes 88 in combination with the pins 36, 42, 50, and 62 allow the sockets 84 to be locked onto the arms 12, 14, 16, and 18.

Figure 2:
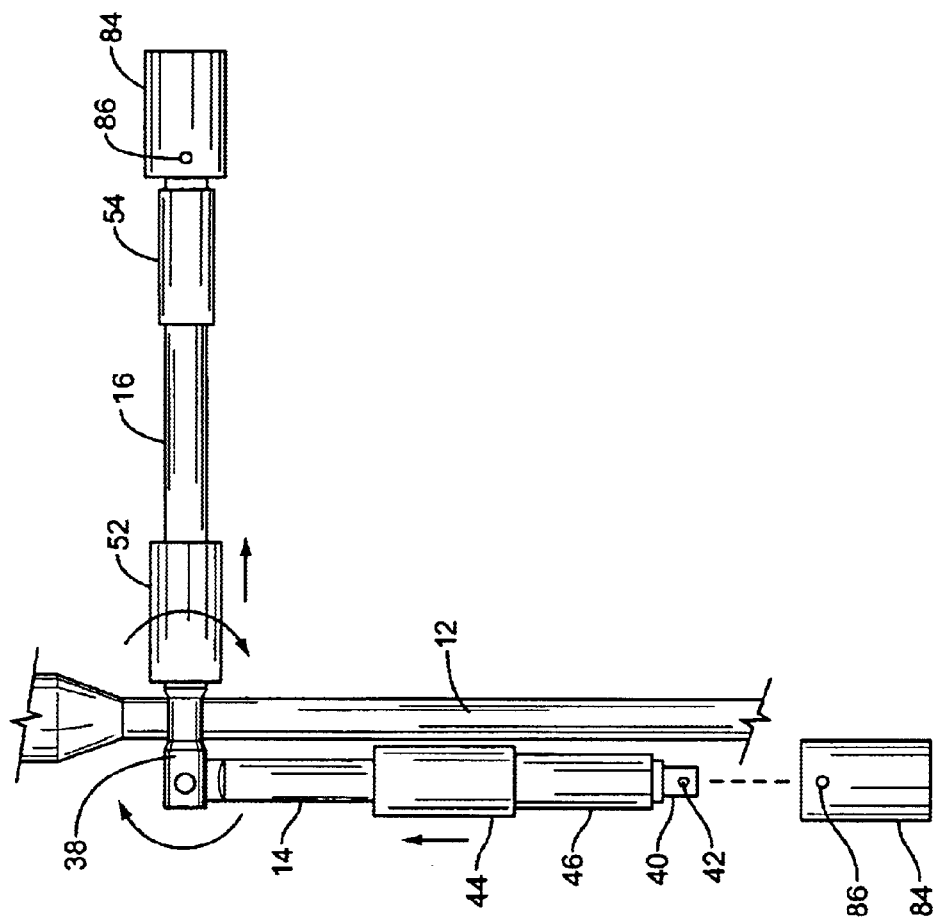
FIG. 2 illustrates the foldable arms of an improved lug wrench according to one embodiment of the present invention.

FIG. 2 illustrates the folding of the second foldable arm 14 and the third foldable arm 16 of the lug wrench 10 in FIG. 1. The second foldable arm 14 is in its folded position. As illustrated, the movement of the first slidable locking member 44 has been limited by the movement limiting member 46, thereby ensuring that the first slidable locking member 44 does not continue to slide off of the second foldable arm 14 when the socket 84 is not attached to the fifth attachment stub 40. In order to extend the second foldable arm 14, the second foldable arm is rotated upward until it is substantially perpendicular to the first arm 12. Once in this position, the first slidable locking member 44 is slid along the second foldable arm 14 until it is partially positioned over the coupling member 38.

Preferably, the first slidable locking member 44 can be slid along the second foldable arm 14 until it becomes in contact with the first arm 12 where substantially half of the first slidable locking member 44 is positioned over the coupling member 38, and substantially half of the first slidable locking member 44 is positioned over the second foldable arm 14. When in this position, the first slidable locking member 44 locks the second foldable arm 14 in place.

The third foldable arm 16 is shown in its extended position and can also be folded by sliding the second slidable locking member 52 away from the first arm 12 until the second slidable locking member 52 is completely removed from the coupling member 38. This allows the third foldable arm 16 to rotate freely downward until it is substantially parallel to the first arm 12. Again, the movement of the second slidable locking member 52 is limited by the movement limiting member 54, thereby ensuring that the second slidable locking member 52 cannot be removed from the third foldable arm 16 when the socket 84 is not attached to the sixth attachment stub 48.

Figure 3A:
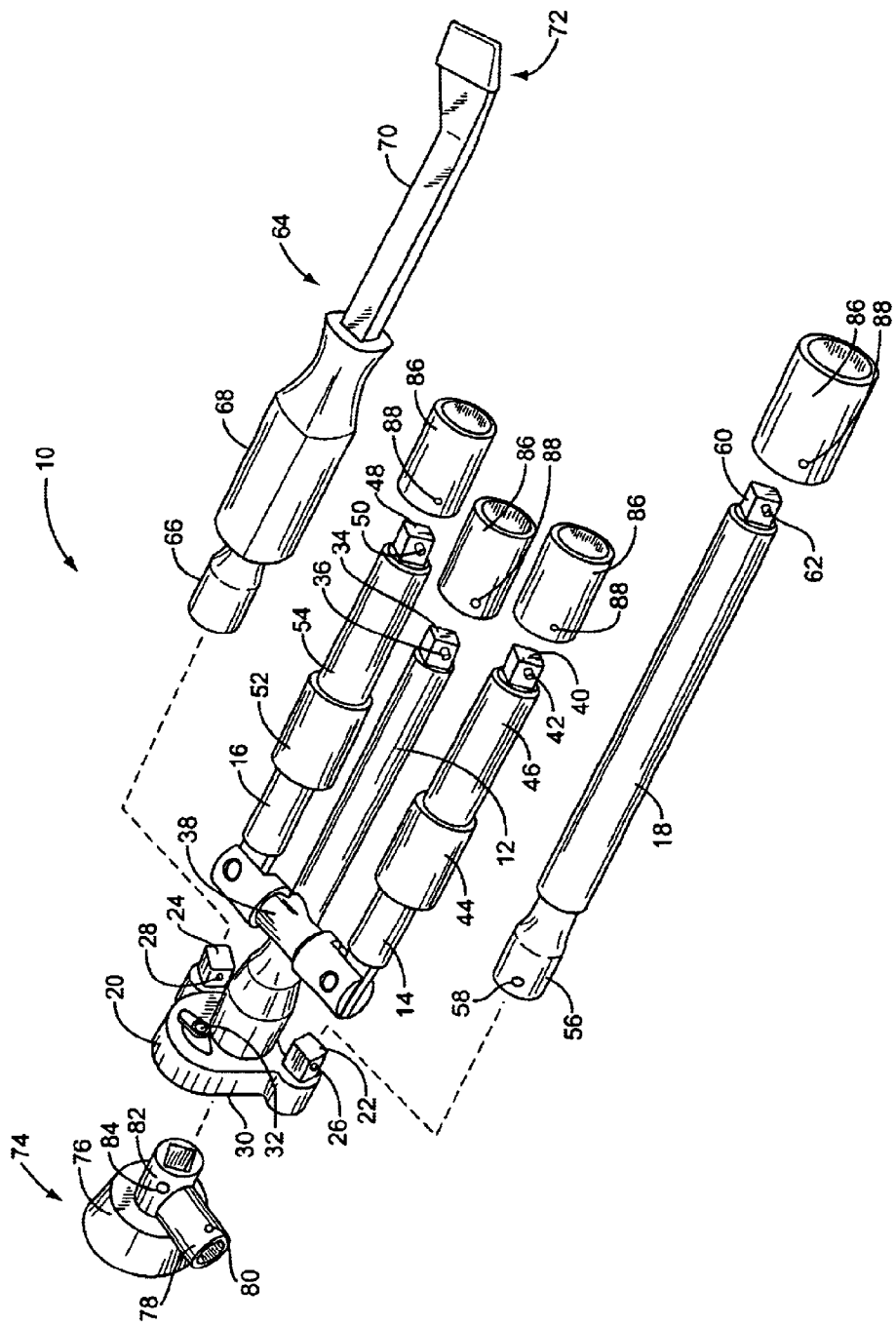
FIG. 3A illustrates the improved lug wrench having been fully folded and the connections of the various components to the mounting member.

FIG. 3A illustrates the improved lug wrench 10 illustrated in FIGS. 1 and 2 in a folded configuration and further showing the connections of the various components. The second and third foldable arms 14 and 16 have been folded downward such that they are substantially parallel to the first arm 12. The detachable arm 18 has been detached from the third attachment stub 30 on the mounting member 20 and is ready to be attached to the first attachment stub 22 on the mounting member 20. The detachable tire cover removal tool 64 can be attached to the second attachment stub 24 on the mounting member once the third foldable arm 16 is folded. The detachable hammer head 74 is can be attached to the third attachment stub 30. In addition, the sockets 86 are ready to be attached to the attachment stubs 34, 40, 48, and 60 of the first, second, third, and fourth arms 12, 14, 16, and 18, respectively.

Figure 3B:
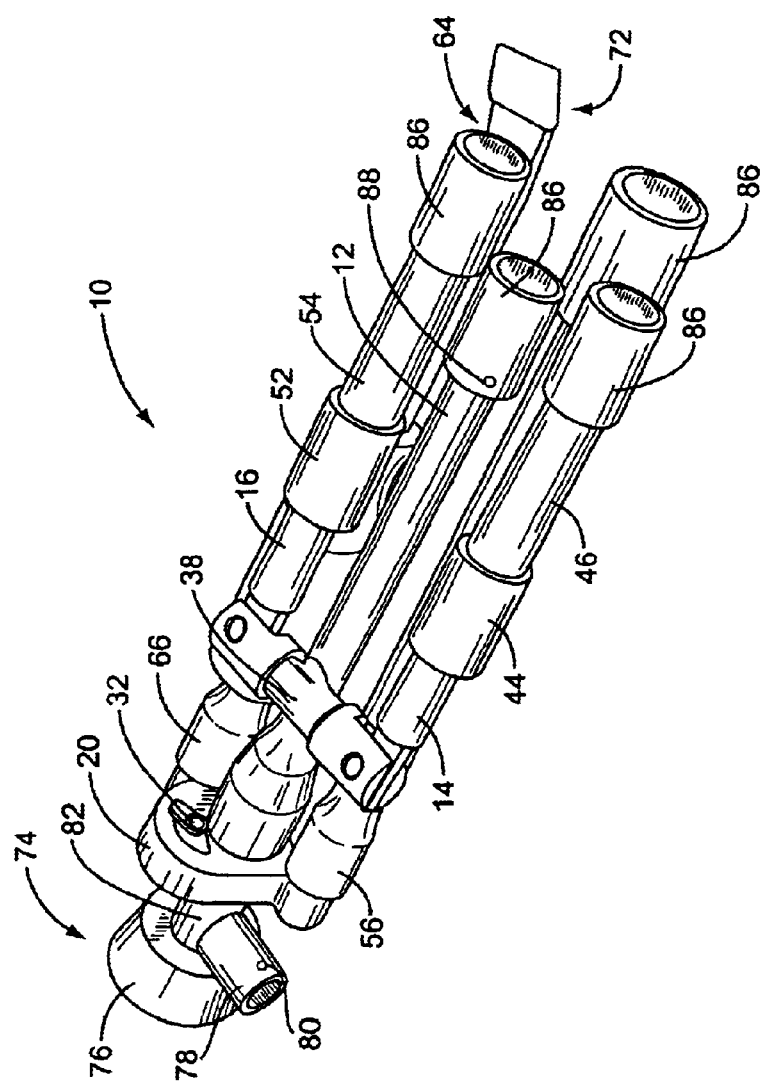
FIG. 3B illustrates the improved lug wrench having been fully folded and having the various components connected to the mounting member.

FIG. 3B illustrates the improved lug wrench 10 illustrated in FIGS. 1–3A in its completely folded state with all auxiliary attachments connected. Just as illustrated in FIG. 3A, the second and third foldable arms 14 and 16 have been folded downward such that they are substantially parallel to the first arm 12. The detachable arm 18 has been attached to the mounting member 20 via the first attachment stub (not shown). The tire cover removal tool 64 and the hammer head 74 are attached to the mounting member 20 via first and third attachment stubs (not shown), and the sockets 86 are attached to the arms 12, 14, 16, and 18.

In summary, FIG. 3B illustrates that the overall size of the lug wrench 10 can been minimized for storage by first folding the second and the third foldable arms 14 and 16 such that they are substantially parallel to the first arm 12. The fourth detachable arm 18 and the tire cover removal tool 64 are then attached to the mounting member 20 such that it is substantially parallel to the first arm 12, and the hammer head 74 is also attached to the mounting member 20. Additionally, the socket 84 may be attached to the arms 12, 14, 16, and 18. This configuration minimizes the storage space required to store the lug wrench 10.

Figure 4:
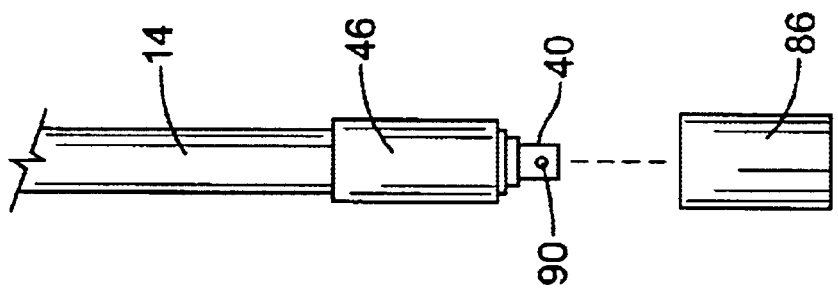
FIG. 4 illustrates an attachment stub having a spring-loaded ball socket according to one embodiment of the improved lug wrench of the present invention.

FIG. 4 illustrates an alternative embodiment of the attachment stubs 22, 24, 30, 34, 40, 48, and 60 illustrated in FIGS. 1–3B. As an example, a portion of the second foldable arm 14 containing the fifth attachment stub 40 is shown. However, it is to be understood that this discussion can apply to all of the attachment stubs 22, 24, 30, 34, 40, 48, and 60 and any additional attachment stubs introduced below as desired by the designer. In this embodiment, a spring-loaded ball 90 replaces the spring loaded pin 42 shown in the earlier figures. The spring-loaded ball 90 allows the socket 86 to be easily removed from the fifth attachment stub 40 of the second foldable arm 14. While the spring-loaded ball 90 simplifies removing the socket 86, it may not offer the a sufficient level of resistance when a force is applied to the lug wrench 10 to keep the socket 86 attached to an the attachment stub 22, 24, 30, 34, 40, 48, and 60. Therefore, the spring-loaded ball 90 may or may not be desirable depending on the application.

Figure 5:
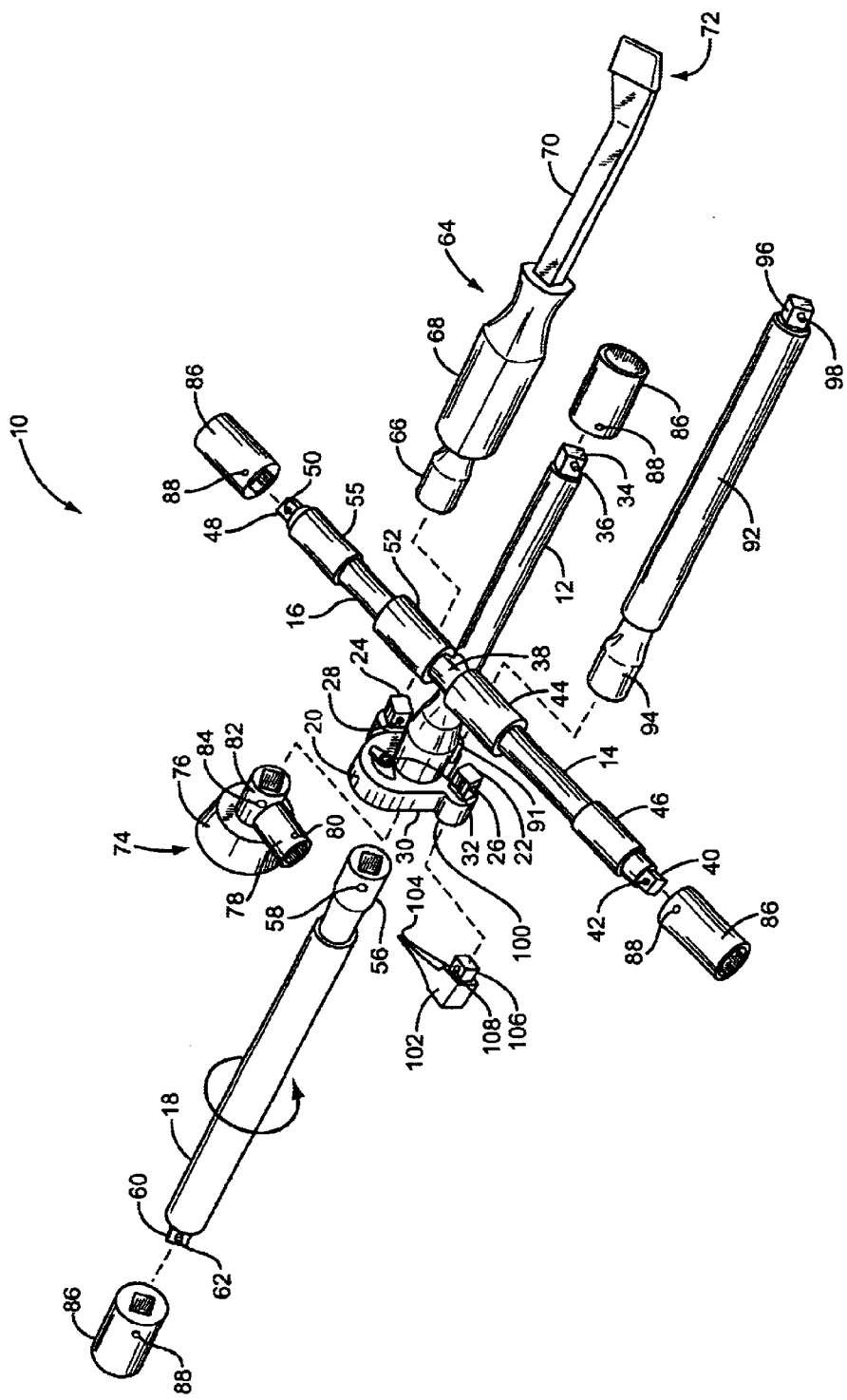
FIG. 5 illustrates an improved lug wrench according to another embodiment of the present invention.

FIG. 5 illustrates another embodiment of the improved lug wrench 10. In this embodiment, the lug wrench 10 has all of the features of the lug wrench 10 illustrated in FIGS. 1–4. In addition, the mounting member 20 of the lug wrench 10 of this embodiment includes an eighth attachment stub 91 with a spring-loaded ball (not shown). A hammer handle 92 has a first end 94 capable of attaching to the eighth attachment stub 91. The other end of the hammer handle 92 has a ninth attachment stub 96 with a spring-loaded pin 98. The hammer handle 92 can be detached from the mounting member 20, and the hammer head 74 can be attached to the hammer handle 92 via the ninth attachment stub 96, thereby creating a detachable hammer (not shown). The combination of the hammer head 74 and the hammer handle 92 provides a hammer that is independent from the lug wrench 10 that can be used for various tasks including but not limited to replacing the tire cover (not shown) onto the wheel (not shown).

In addition to the eighth attachment stub 90, the mounting member 20 of the lug wrench 10 according to this embodiment has a pin tool socket 100 capable of receiving a pill releasing tool 102, thereby attaching the pin releasing tool 102 to the mounting member 20. The pin releasing tool 102 has a pointed end 104 designed to pass through the holes 58 and 88 in order to compress the spring-loaded pins 36, 42, 50, and 62, thereby releasing the fourth detachable arm 18 from the third attachment stub 30 and the sockets 86 from the fourth fifth, sixth, and seventh attachment stubs 34, 40, 48, and 60. The pin releasing tool 102 has a tenth attachment stub 106 having a spring-loaded ball 108 capable of attaching to the mounting member 20 via the pin tool socket 100.

FIGS. 6 and 7 illustrate alternative embodiment of the lug wrench 10 of the present invention where the lug wrench 10 does not fold. FIG. 6 illustrates the lug wrench 10 having the first arm 12, mounting member 20, and the tire cover removal tool 64. In this embodiment, the mounting member may or may not be capable of performing a ratcheting action. Again, the mounting member 20 has a first attachment stub 22 having a spring-loaded ball. The tire cover removal tool 64 has the first end capable of attaching to the first attachment stub 22, the handle 68, and the working member 70 having the pointed tip and tip cover 72. The socket 86 can be any size and is capable of attaching to the fourth attachment stub 34 via the spring-loaded pin 36 and the hole 88.

FIG. 7 illustrates another embodiment of the lug wrench 10 that has the first arm 12 that does not fold. As illustrated in FIG. 7, the third attachment stub 30 has a spring-loaded pin 110 and is attached to the first arm 12 instead of the mounting member (not shown). However, this embodiment could also include the mounting member (not shown) coupling the first arm 12 to the third attachment stub 30. Just as in FIGS. 1 and 5, the hammer head 74 includes the rubber head 76 and the first and second sockets 78 and 82. The hammer head 74 can be attached to the third attachment stub 30, thereby attaching the hammer head 74 to the first arm 12. The first arm 12 also has the fourth attachment stub 34 capable of attaching to the socket 86.

The foregoing details should, in all respects, be considered as exemplary rather than as limiting. The present invention allows significant flexibility in terms of implementation and operation. Examples of such variation are discussed in some detail above; however, such examples should not be construed as limiting the range of variations falling within the scope of the present invention. The scope of the present invention is limited only by the claims appended hereto, and all embodiments falling within the meaning and equivalency of those claims are embraced herein.

Those skilled in the art will recognize improvements and modifications to the preferred embodiments of the present invention. All such improvements and modifications are considered within the scope of the concepts disclosed herein and the claims that follow.

I claim:

1. An improved lug wrench comprising:
   a first arm comprising a first end and a second end, wherein said fist end contains a first attachment stub and said second end contains a mounting member wherein said mounting member contains a second attachment stub and a third attachment stub;
   a second foldable arm comprising a first end having a fourth attachment stub and a second end foldably attached to said first arm, wherein said second foldable arm is substantially perpendicular to said first arm when extended;
   a third foldable arm comprising a first end having a fifth attachment stub and a second end foldably attached to slid first arm, wherein said third foldable arm is substantially perpendicular to said first arm when extended; and
   a detachable arm comprising a first end adapted to connect to said second or third attachment stub and a second end having a sixth attachment stub, wherein said detachable arm is substantially in line with said first arm when attached to said second attachment stub and substantially parallel to said first arm when attached to said third attachment stub.

2. The improved lug wrench of claim 1, wherein said second foldable arm and said third foldable arm are substantially parallel to said first arm when folded.

3. The improved lug wrench of claim 1, wherein said mounting member further contains a seventh attachment stub.

4. The improved lug wrench of claim 3, further comprising a detachable tire cover removal tool adapted to connect to said seventh attachment stub such that said detachable tire cover removal tool is substantially parallel to said first arm when connected to said seventh attachment stub.

5. The improved lug wrench of claim 4, wherein said mounting member further contains an eighth attachment stub.

6. The improved lug wrench of claim 5, further comprising a detachable handle comprising a first end adapted to connect to said eighth attachment stub and a second end having a ninth attachment stub, wherein said detachable handle is substantially parallel to said first arm when attached to said eighth attachment stub.

7. The improved lug wrench of claim 6, further comprising a detachable hammer head having a first socket adapted to connect to said ninth attachment stub such that said detachable hammer head is perpendicular to said detachable handle.

8. The improved lug wrench of claim 7, wherein said detachable hammer head has and a second socket adapted to connect to said ninth attachment stub such that said detachable hammer head is in line with said detachable handle.

9. The improved lug wrench of claim 1, further comprises at least one socket adapted to connect to any of said first, fourth, fifth, or sixth attachment stubs.

10. The improved lug wrench of claim 9, wherein each of said at least one socket are all different sized sockets.

11. The improved lug wrench of claim 1, farther comprising a coupling member attached to said first arm and adapted to foldably attach said second end of said second foldable arm to said first arm and foldably attach said second end of said third foldable arm to said first arm.

12. The improved lug wrench of claim 11, wherein said second foldable arm further comprises a first slidable sleeve adapted to lock said second foldable arm in its extended position and said third foldable arm further comprises a second slidable sleeve adapted to lock said third foldable arm in its extended position.

13. The improved lug wrench of claim 12, wherein said second foldable arm is further adapted to limit the movement of said first slidable sleeve such that said first slidable sleeve cannot be removed from said second foldable arm, and wherein said third foldable arm is further adapted to limit the movement of said second slidable sleeve such that said second slidable sleeve cannot be removed from said third foldable arm.

14. The improved log wrench of claim 1, wherein said first, second, third, fourth, fifth, and sixth attachment stubs are selected from the group comprising: a spring-loaded ball attachment stub and a spring-loaded pill attachment stub.

15. The improved lug wrench of claim 1, wherein said first arm comprises a ratcheting member.

16. The improved lug wrench of claim 15, wherein said second attachment stub is it part of said ratcheting member.

17. The improved lug wrench of claim 15, wherein said second foldable arm and said third foldable arm are substantially parallel to said first arm when folded.

18. The improved lug wrench of claim 15, wherein said mounting member further contains a seventh attachment stub.

19. The improved lug wrench of claim 18, further comprising a detachable tire cover removal tool adapted to connect to said seventh attachment stub such that said detachable tire cover removal tool is substantially parallel to said first arm when connected to said seventh attachment stub.

20. The improved lug wrench of claim 19, wherein said mounting member furthers contains an eighth attachment stub.

21. The improved lug wrench of claim 20, further comprising a detachable handle comprising a first end adapted to connect to said eighth attachment stub and a second end having a ninth attachment stub, wherein said detachable handle is substantially parallel to said first arm when attached to said eighth attachment stub.

22. The imp roved lug wrench of claim 21, further comprising a detachable hammer head having a first socket adapted to connect to said ninth attachment stub such that said detachable hammer head is perpendicular to said detachable handle.

23. The improved lug wrench of claim 22, wherein said detachable hammer head has and a second socket adapted to connect to said ninth attachment stub such that said detachable hammer head is in line with said detachable handle.

24. The improved lug wrench of claim 15, further comprising a plurality of sockets adapted to connect to any of said first, fourth, fifth, or sixth attachment stubs.

25. The improved lug wrench of claim 15, further comprising a coupling member attached to said first arm and adapted to foldably attach said second end of said second foldable arm to said first arm and foldably attach said second end of said third foldable arm to said first arm.

26. The improved lug wrench of claim 25, wherein said second foldable arm further comprises a first slidable sleeve adapted to lock said second foldable arm in its extended position and said third foldable arm further comprises a second slidable sleeve adapted to lock said third foldable arm in its extended position.

27. The improved lug wrench of claim 26 wherein said second foldable arm is further adapted to limit the movement of said first slidable sleeve such that said first slidable sleeve cannot be removed from said second foldable arm, further wherein said third foldable arm is further adapted to limit the movement of said second slidable sleeve such that said second slidable sleeve cannot be removed from said third foldable arm.

28. The improved lug wrench of claim 1, wherein said first, second, third, fourth, fifth, and sixth attachment stubs are selected from the group comprising: a spring-loaded ball attachment stub and a spring-loaded pin attachment stub.

29. The improved lug wrench of claim 28, further comprising a pin releasing tool having a first end adapted to release said spring-loaded pin attachment stub and a second end having a seventh attachment stub and wherein said mounting member has a socket adapted to receive said seventh attachment stub.

30. A lug wrench, comprising:
- a first arm comprising a first end and a second end, wherein said first end contains a first attachment stub and said second end contains a mounting member wherein said mounting member contains a second attachment stub;
- a second arm comprising a first end having a third attachment stub and a second end attached to said first arm wherein said second arm is substantially perpendicular to said first arm;
- a third arm comprising a first end having a fourth attachment stub and a second end attached to said first arm, wherein said third arm is substantially perpendicular to said first arm;
- a fourth arm comprising a first end having a fifth attachment stub and a second end attached to said second end of said first arm, wherein said fourth arm is substantially perpendicular to said second arm and said third arm; and
- a detachable tire cover removal tool adapted to connect to said second attachment stub such that said detachable tire cover removal tool is substantially parallel to first arm when connected to said second attachment stub.

31. The lug wrench of claim 30, wherein said detachable tire cover removal tool comprises a first end and a second end, wherein said first end is adapted to connect to said second attachment stub and said second end has a pointed edge.

32. A lug wrench, comprising:
- a first arm comprising a first end and a second end, wherein said first end contains a first attachment stub and said second end contains a mounting member wherein said mounting member contains a second attachment stub;
- a second arm comprising a first end having a fourth attachment stub and a second end attached to said first arm, wherein said second arm is substantially perpendicular to said first arm;
- a third arm comprising a first end having a fifth attachment stub and a second end attached to said first arms wherein said third arm is substantially perpendicular to said first arm; and
- a fourth arm comprising a first end having a sixth attachment stub and a second end attach to said first are, wherein said fourth arm is substantially in line with said first arm;
- a detachable handle comprising a first end adapted to connect to said second attachment stub and a second end having a third attachment stub, wherein said detachable handle is substantially parallel to said first arm when attached to said second attachment stub; and
- a detachable hammer head adapted to connect to said third attachment stub.

33. The lug wrench of claim 32, wherein said detachable hammer head has a first socket adapted to connect to said third attachment stub such that said hammer head is perpendicular to said detachable handle.

34. The lug wrench of claim 33, wherein said detachable hammer head has a second socket adapted to connect to said third attachment stub such that said hammer head is in line with said detachable handle.

* * * * *